Dec. 15, 1970
C. D. SNEAD ET AL
3,547,891
HEAT FORMABLE POLYESTER FILM
Filed April 2, 1969
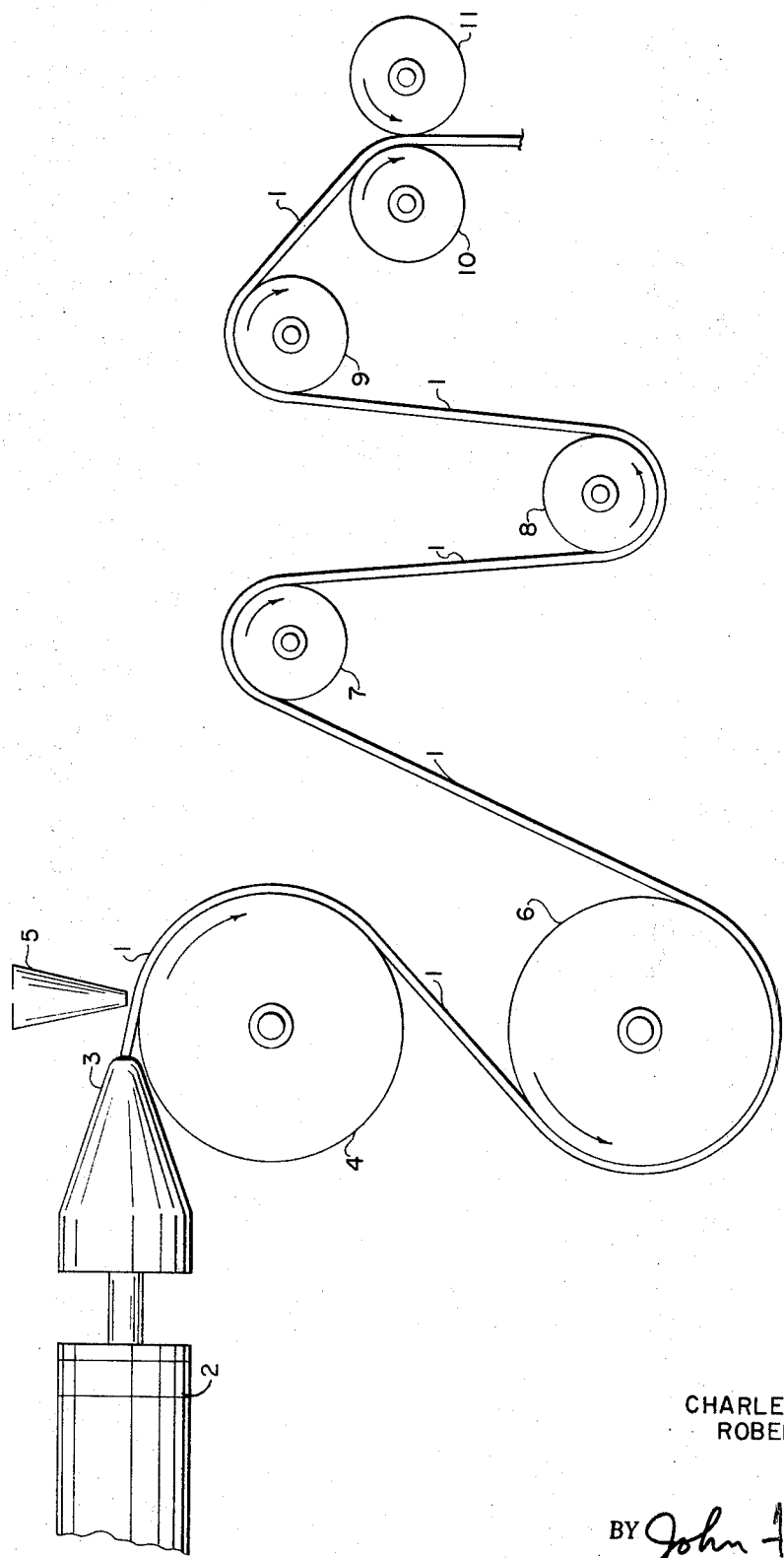
CHARLES D. SNEAD
ROBERT L. LONG
*INVENTOR.*
BY *John J. Steven*
ATTORNEYS United States Patent Office 3,547,891
Patented Dec. 15, 1970

3,547,891
HEAT FORMABLE POLYESTER FILM
Charles D. Snead and Robert L. Long, Alexandria, Va., assignors to Eastman Kodak Company, Rochester, N.Y., a corporation of New Jersey
Continuation-in-part of application Ser. No. 539,128, Mar. 31, 1966. This application Apr. 2, 1969, Ser. No. 812,790
Int. Cl. C08g *17/08*
U.S. Cl. 260—75                         11 Claims

ABSTRACT OF THE DISCLOSURE

A polyester film suitable for heat forming into articles which are free of blush marks and wrinkles, and exhibit excellent strength properties. The film is prepared by introducing a slight strain therein in at least one direction while the film is above the second order transition temperature. The strain is introduced by stretching the film at a ratio between 1.02:1 and 1.25:1 so that it is free of appreciable molecular orientation and substantially amorphous.

---

This application is a continuation-in-part of copending U.S. Ser. No. 539,128 filed Mar. 31, 1966 and now abandoned.

This invention relates to a process for providing an improved polyester film which is amenable to heat forming. In particular, this invention relates to a method for forming film material which is free of appreciable orientation and is substantially amorphous. Such material is suitable for making a contour package or other heat formed articles and to the film material and products formed by the process.

Briefly, it has been found that by imparting a slight strain to cast, unoriented, non-crystallized polyester film material in a particular manner, the film will become amenable to heat forming processes such as contour packaging.

Polyesters referred to in this invention consist of high-molecular-weight esters which are the condensation products of dicarboxylic acids such as terephthalic acid, isophthalic acid, sebacic acid, and the like; and dihydric alcohols such as ethylene glycol, diethylene glycol, cyclohexanedimethanol, and the like; and polyesters modified with small concentrations of polycarboxylic acids or polyhydric alcohols such as neopentyl glycol. The manufacture of these polyesters is well known in the art. For example, polyethylene terephthalate may be prepared by the condensation of ethylene glycol and terephthalic acid, or by carrying out an ester interchange reaction between ethylene glycol and a dialkyl ester of terephthalic acid, for example dimethyl terephthalate. It has been found that particularly good results may be obtained by the use of polyester condensation polymer of a major amount of terephthalic acid and a minor amount of isophthalic acid with a dihydric alcohol.

The polyester film may be prepared by feeding polyester material through a hopper to the screw of an extruder. The extruder melts the material and develops sufficient pressure to force the melt through a die. The pressure developed by the screw forces the material to be evenly distributed in the die and to flow out of the die slot onto a casting roll. In this form the cast film is amorphous (non-crystallized) and unoriented. The heat is then withdrawn from the cast film by cooling means within the casting roll. The cast film is then stripped from the casting roll and is ready for subsequent treatment if such is desired.

Generally, cast polyester film is considered to be inferior for most applications. In the Scarlett Pat. No. 2,823,421, a number of advantages of cast polyethylene terephthalate film are noted. It is stated that the film has certain physical properties which make it useful in a number of applications such as packaging, electrical applications as a dielectric, protective coverings, glass replacements, etc. However, the Scarlett patent also points out that with respect to certain physical properties such as tensile strength, impact strength, flex life, water vapor and organic vapor permeability and tensile modulus, the film is not competitive with other types of film compositions. In the balance, the disadvantages of cast film are generally considered to outweigh the advantages, as a result of which cast unoriented polyester film is not used. Rather, for most applications of polyester film the film is first stretched in either one or two directions to impart orientation to the film. Thus it is significant that the present invention provides a film which is free of appreciable orientation and is substantially amorphous and which exhibits superior properties to the polyester films heretofore available.

It is to be understood that the film of the present invention is suitable for use in almost any clear film or sheet application. However, the film will be discussed with particular reference to contour packaging, for purposes of illustration, since this is the largest and most important single application of the film. Contour packaging, as referred to in this invention, applies to the operation of shaping plastic sheeting or film, by means of dies, into or onto formed articles. Many such articles are used for packaging products. For example, a 10 mil thick sheet or film of plastic can be molded onto the form of a hemisphere to serve as a protective, decorative, clear, transparent cover over an article mounted on a cardboard backing. The articles can, of course, be formed in practically any shape and used as toys, box or can lids, electric switch covers, trays, housings and the like. The films produced in accordance with this invention can be contour formed on any conventional contour forming machine in a manner similar to other contour forming thermoplastic films now being used such as styrene films, vinyl films, polyolefin films and cellulose ester films such as cellulose acetate, cellulose acetate propionate, and cellulose acetate butyrate.

The present invention thus represents an entirely new concept in polyester films for heat forming processes such as contour packaging. Without the teachings of the present invention, substantially amorphous films have indeed been unsuitable for this purpose.

More specifically, for the following reasons, the teachings of the prior art would not have led one to have employed a substantially amorphous but readily crystallizable polyester film which is free of appreciable orientation for heat forming processes such as contour forming. In the contour forming operation the film must be subjected to extensive heat and to deep drawing, or stretching, in a non-planar manner without blushing, wrinkling, or becoming cloudy in appearance or becoming embrittled. It is known that the degree and rate of crystallization of polyesters are affected by the chemical structure of the film. In general we have found that those polyesters having a structure such that the products made therefrom are most difficult to crystallize, are preferred for the manufacture of sheet or film as disclosed in this invention. However, it has been unobvious heretofore that a substantially unoriented and substantially amorphous, but readily crystallizable polyester in the form of film or sheeting could withstand the heating and drawing of the contour forming operation without becoming crystalline, blushed, wrinkled and embrittled, and thereby rendered useless. When the film is processed according to the present invention, however, even the readily crystallizable film can be heated and drawn to form the package while remaining substantially amorphous and without blushing, wrinkling, or becoming embrittled. Thus films or sheeting from the more economical readily crystallizable polyesters, as well as the films or sheeting from the more difficult to crystallize polyesters, can be used to form the contour package according to the present invention.

The process of the present invention is as follows. The film is first extruded through a die slot in the usual manner. Following the extrusion step, at a temperature within the range from the second order transition temperature to approximately 50° C. above this temperature, a small amount of strain is imparted to the film. Environmental temperatures will depend on several variables such as film thickness, speed of the film and the molecular weight of the polyester. Although the exact molecular inter-arrangement caused by the slight strain is not entirely understood, this slight strain must be distinguished from the usual stretching operations. Unlike the usual stretching operation, the slight strain is not intended to, and it does not, induce more than a negligible orientation in the film. Rather, the film remains substantially free of so-called orientation and is essentially amorphous.

The desired strain can be imparted to the film by employing at least two casting rolls to receive the cast film, the second of which has a higher peripheral speed than the first so that the differential speed between the rolls causes the slight strain. Alternately, the strain could be induced in the transverse direction by tentering. The strain should be induced, however, while the film is above the second order transition temperature, preferably in the range from the second order transition temperature to approximately 50° C. above this temperature.

As stated above, the slight strain is distinguishable from the stretching, or drawing, operation normally applied to polyester films to induce orientation. Whereas films are normally stretched two, three, four times their original dimension to induce orientation, in the present invention the stretching should be only between two and twenty-five percent so that the stretch ratio would be 1.02:1 to 1.25:1, with the range of 1.05:1 to 1.15:1 being preferred. This merely strains the film and does not induce more than a negligible amount of so-called orientation, and this is quite different from conventional orientation where the stretch ratio would be at least two, and usually three or four to one.

The film produced by this method has been contour formed into articles in commercial vacuum forming machines. When first heated, the film tends to sag. But it then becomes taut when the residual strain is released. The film is then formed into articles by drawing. It has been found that the resultant product is tough, non-blushed, and more important, even after the extensive heating and stretching, the film is still essentially amorphous.

The term "second order transition temperature" is used quite often herein to indicate a temperature below the melting point at which a particular polymer loses its elasticity (see "Man-Made Fibres," fourth edition, by R. W. Moncrieff, and "Journal of Applied Physics," vol. XX, June 1949, page 564). The term "film" is used herein in a generic sense, and includes material sometimes referred to as "sheet" by those skilled in the art. According to this invention, the stretch ratio should be no greater than 1.25:1, with an upper limit of about 1.15:1 being preferred, to obtain a film which is free of appreciable orientation.

Accordingly, it is an object of this invention to provide a method for forming a polyester film or sheet which, although essentially amorphous and substantially unoriented, is superior for use in heat forming processes such as contour packaging.

It is another object of this invention to provide a process for imparting a slight strain to an essentially amorphous and substantially unoriented polyester film.

It is another object of this invention to provide a polyester sheet which when clamped in a frame will become plane or taut after first sagging when heated to forming temperatures.

It is another object of this invention to provide a superior polyester film capable of forming contoured packages or articles which is non-brittle, and has excellent toughness and high clarity.

It is still another object of this invention to provide a package or a shaped article, a portion of which package or shaped article is formed from a polyester film produced according to the process of the present invention.

These and other objects, features, and advantages of the present invention will become apparent from the following detailed description of the invention together with the accompanying drawing.

The figure represents a schematic view of an apparatus for carrying out the process of the invention.

In the single figure the film 1 is extruded from the extruder 2 through the slitted opening 3. The film then passes on to a primary casting roll 4 on which the film is cooled by water within the roll 4 thereby causing the molten stream to form into a solid sheet. An air knife 5 is employed to assure intimate contact of the sheet and the primary casting roll 4. The solid sheet, or film, proceeds to a secondary casting roll 6, the temperature of which is also controlled by water, cooled or heated as required. The sheet then continues around a set of guide rolls 7, 8 and 9 to nip rolls 10 and 11 which maintain tension on the sheet. Guide rolls 7, 8 and 9 are also water cooled or heated to control the sheet temperatures.

Of the various methods discussed above for imparting a slight strain to the film material, the differential surface speed method is preferred. The apparatus shown schematically in the figure can be operated by at least two different procedures to perform the straining operation according to the differential surface speed method. The temperature of the film in the extruder step is approximately 550° F. After extrusion the film is immediately cooled on the primary casting roll 4. However, in the differential surface speed method, a portion of the heat imparted to the film during the extrusion step is retained during the straining step.

According to the first procedure for imparting the slight strain to the film, the secondary casting roll 6 and subsequent rolls may be made to rotate with a surface speed equal to each other but greater than the surface speed of the primary casting roll 4. The surface speed differential should be at least 1.02:1 and less than 1.25:1. Although the film is cooled from its very high extrusion temperature when it contacts the primary casting roll 4. nonetheless the film is still maintained above its second order transition temperature at the primary casting roll. Then at the subsequent rolls, the film should be cooled using about 120° F. or lower cooling means. It should be understood that the maximum stretch ratio is 1.25:1, and that this operation results in a film which is free of appreciable orientation.

Although stretching at between 2% and 25% the original dimension, such that the stretched dimension is elongated an amount between 2% and 25%, inherent induces a very small degree of orientation, the film remains free of appreciable orientation. This orientation, in fact, is so slight that it is practically unmeasurable in at least some of the commonly accepted techniques for determining orientation. If the amount of orientation is carried beyond that amount induced by 25% stretching, the orientation and crystallization increases to the point that heat forming temperatures become too high, and causes further crystallization. Furthermore, the film is substantially amorphous, as shown by the fact that the density is raised only slightly.

Alternatively, the two casting rolls 4 and 6 may be made to operate at the same surface speed while the guide rolls 7, 8 and 9 operate at a higher surface speed. As in the first procedure, the speed differential will be between 1.02:1 and 1.25:1. In this instance both the primary and secondary casing rolls 4 and 6 will be maintained at such a temperature as to keep the film temperature above its second order transition temperature while the temperature of the guide rolls 7, 8 and 9 is controlled to 120° F. or below.

The following examples will further serve to illustrate the principles and practice of the present invention. These examples are given by way of illustration only and are in no way intended to limit the scope of the present invention.

EXAMPLE 1

Polyethylene terephthalate is extruded in a conventional 3½ inch extruder equipped with rolls as shown in the figure. The primary casting roll 4 is maintained at 190° F. and 15.7 ft./min. surface speed. The secondary casting roll 6 is maintained at 200° F. and 17.4 ft./min. surface speed. The guide rolls 7, 8 and 9 and the nip rolls 10 and 11 are maintained at 120° F. and 17.9 ft./min. Thus the stretch ratio of 17.9:15.7 or 1.14:1. Thus, the film is stretched at a temperature above its second order transition temperature, which for this film is about 158° F. This film or sheet, 7½ mils thick, is placed in a commercial vacuum forming frame and heated with infrared heaters. The sheet begins to sag within 1½ seconds and draws back taut in the frame at about two seconds at which time a female mold is pushed into the sheet, the heat source removed, and vacuum applied to cause the sheet to assume the shape of the mold. The part formed in this manner is allowed to cool in the mold, the vacuum is released, and a tough, essentially amorphous, non-blushed blister is obtained.

EXAMPLE 2

Polyethylene terephthalate is extruded in a conventional 3½ inch extruder equipped with rolls as shown in the figure. The primary casting roll 4 is maintained at 180° F. and 17.3 ft./min. surface speed. The secondary casting roll 6 is maintained at 150° F. and 17.3 ft./min. surface speed. The guide rolls 7, 8 and 9 and the nip rolls 10 and 11 are maintained at 120° F. and 17.7 ft./min. surface speed. Thus the stretch ratio is 17.7:17.3 or 1.02:1. This 7½ mil film or sheet so produced is checked in the same equipment as used in Example 1 with the same result, although less taut. The blister produced is essentially amorphous, tough, and is not blushed.

EXAMPLE 3 (FOR COMPARISON)

Polyethylene terephthalate film is formed in a manner similar to that described in Examples 1 and 2 except that the surface speeds of all the rolls are constant at 17.7 ft./min. An essentially amorphous polyethylene terephthalate film or sheet 7½ mils in thickness is produced and tested in the same manner as in Examples 1 and 2. The sheet is placed in a commercial vacuum forming frame and heated within infrared heaters. The sheet begins to sag within 1½ seconds and continues to sag. The sheet does not return to a taut condition. Other sheets are tried with the same result. At the two-second time interval on several trials, the female mold is pushed into the sagging sheet and vacuum applied. The resulting blister contains wrinkles.

EXAMPLE 4

The condensation polymer made from about 83 mole percent terephthalic acid, about 17 mole percent isophthalic acid and 1,4-cyclohexanedimethanol as described in U.S. Pat. 2,901,466 granted Aug. 25, 1959, is extruded in a conventional extruder equipped with rolls as shown in the drawing. Roll 4 is maintained at 155° F. and 31 ft./min. surface speed. Roll 6 is maintained at 130° F. and 34 ft./min. surface speed. Thus, the stretch ratio is 34/30, or 1.13. This film or sheet, about 7½ mils thick, is placed in a commercial vacuum forming frame and heated. The sheet first sags and then draws back taut, at which time the sheet is molded and the heat source is removed. The part formed in this manner is allowed to cool in the mold, and a tough part having a density of 1.195 grams per cubic centimeter is obtained, indicating an extremely low crystallinity, or an essentially amorphous state. Also, the amount of orientation is negligible. This part is found to be extremely resistant to fracture, and is not brittle.

Representative properties of the condensation polymer film of 83 percent terephthalic acid, 17 percent isophthalic acid and 1,4-cyclohexanedimethanol made in accordance with the invention are as follows: haze, 3% (ASTM Method D-1003); gloss at 45° (Gardner rating), 101 (ASTM Method C-346); tear strength (Elmendorf) 137 grams/mil in the machine direction and 128 grams/mil in the transverse direction (ASTM Method D-1992); impact strength, 365 grams (Dart at 26", ASTM Method D-1709); tensile strength at fracture, 6965 p.s.i. in the machine direction and 6835 p.s.i. in the transverse direction (ASTM Method D-882); and tensile modulus of elasticity, 216,000 p.s.i. in the machine direction, and 208,000 p.s.i. in the transverse direction (ASTM Method D-882). Values are for 7½ mil film, except for tear strength, which is for 6 mil film.

Representative properties of polyethylene terephthalate 7½ mil film produced in accordance with this invention are as follows: average density, 1.34 grams/cubic centimeter (ASTM Method D-1505); haze, 1% (ASTM Method D-1003); gloss at 45° (Gardner rating), 109 (ASTM Method C-346); tear strength (Elmendorf), 60 grams/mil in the machine direction and 90 grams in the transverse direction (ASTM Method D-1992); impact strength, greater than 135 grams (Dart, at 26", ASTM Method D-1709); tensile strength at fracture, 7910 p.s.i. in the machine direction and 7750 p.s.i. in the transverse direction (ASTM Method D-882); and tensile modulus of elasticity, 310,000 p.s.i. in the machine direction and 314,000 p.s.i. in the transverse direction (ASTM Method D-882).

From the examples, it becames apparent that because of the straining of the film as provided according to the present invention, the substantially unoriented and amorphous film can be employed in heat forming processes such as contour forming or blister packaging. In Example 3, where no strain was imparted to the material, the material sagged and would not form an acceptable package conforming to the shape of the article being packaged. It is apparent, therefore, that the multitude of teachings in the prior art of unoriented or amorphous films in no way suggest the present invention. In the prior art the unoriented amorphous films are not strained and they cannot be used successfully in commercial automatic heat forming operations such as contour packaging. Rather, for the most part they merely represent a necessary intermediate product in the production of oriented film.

Summarizing, it has been found, according to the present invention that a cast, essentially amorphous polyester film containing a slight strain in at least one direction may be employed in heat forming operations to form a superior contour formed package wherein the film remains substantially amorphous as a package even though extensive heat and drawing are applied to the film in the forming operation. Cast, unoriented and essentially amorphous polyester films previously described in the art will not contour form satisfactorily on commercial equipment.

Several procedures have been described for imparting the slight strain to the film. These descriptions are not intended to be limiting since, within the spirit and scope of this invention, any means may be employed to impart the strain so long as the resultant film properties are obtained. Normally strain is required only in one direction. However, the film may be strained in more than one direction.

We claim:

1. A substantially unoriented, essentially amorphous, linear, saturated, thermoplastic polyester film suitable for thermoforming into selected shapes, said film having a strain imparted thereto of between 2 and 25% at a temperature within the range from the second order transition temperature for said polyester to approximately 50° C. above the second order transition temperature and subsequently cooling said film to below said second order transition temperature.

2. Polyester film according to claim 1 in which said polyester is the condensation polymer of a major amount of terephthalic acid, a minor amount of isophthalic acid, and a dihydric alcohol.

3. Polyester film according to claim 2 in which said acid is approximately 83 percent terephthalic and 17 percent isophthalic.

4. Polyester film according to claim 2 in which said acid is approximately 83 percent terephthalic and approximately 17 percent isophthalic and said dihydric alcohol is 1,4-cyclohexanedimethanol.

5. Polyester film according to claim 1 in which said polyester is the condensation product of terephthalic acid and ethylene glycol.

6. A process for preparing a polyester film amenable to heat forming operations which comprises the steps of imparting strain to a substantially unoriented, essentially amorphous, linear, saturated, thermoplastic, polyester film by stretching said film at a stretch ratio of between 1.02:1 and 1.25:1 at a temperature within the range from the second order transition temperature for said polyester film to approximately 50° C. above the second order transition temperature, and subsequently cooling said film to below said second order transition temperature.

7. A process according to claim 1 in which said polyester is the condensation polymer of a major amount of terephthalic acid and a minor amount of isophthalic acid, and a dihydric alcohol.

8. A process according to claim 2 in which said dihydric alcohol is 1,4-cyclohexanedimethanol.

9. A process according to claim 2 in which said acid is approximately 83 percent terephthalic and 17 percent isophthalic.

10. A process according to claim 1 in which said polyester is the condensation polymer of terephthalic acid and ethylene glycol.

11. A process according to claim 1 in which said stretch ratio is between 1.05:1 and 1.15.1.

References Cited
UNITED STATES PATENTS

| | | | |
|---|---|---|---|
| 2,556,295 | 6/1951 | Pace | 267—289 |
| 2,847,709 | 8/1958 | Sweet | 264—292 |
| 2,975,484 | 3/1961 | Amboruky | 117—7 |
| 3,030,173 | 4/1962 | Kurzke et al. | 264—210 |
| 3,091,510 | 5/1963 | McCord et al. | 264—320 |
| 3,256,258 | 6/1966 | Herrman | 264—210 |
| 3,293,339 | 12/1966 | Gates | 264—78 |
| 3,299,171 | 1/1967 | Knobloch | 260—857 |
| 3,305,911 | 2/1967 | Chapman et al. | 264—210 |
| 3,361,728 | 1/1968 | Coen et al. | 264—342 |
| 3,379,001 | 4/1968 | Campbell et al. | 57—140 |
| 3,361,861 | 1/1968 | Bertinotti et al. | 264—288 |
| 3,424,835 | 1/1969 | Armour et al. | 264—210 |
| 3,426,754 | 2/1969 | Bierenbaum et al. | 128—156 |

JULIUS FROME, Primary Examiner

J. H. WOO, Assistant Examiner

U.S. Cl. X.R.

264—210, 237, 288

PO-1050
(5/69)

UNITED STATES PATENT OFFICE
CERTIFICATE OF CORRECTION

Patent No. 3,547,891    Dated December 15, 1970

Inventor(s) Charles D. Snead and Robert L. Long

It is certified that error appears in the above-identified patent and that said Letters Patent are hereby corrected as shown below:

Column 8, line 1, "claim 1" should read --claim 6--;
Column 8, line 5, "claim 2" should read --claim 7--;
Column 8, line 7, "claim 2" should read --claim 7--;
Column 8, line 10, "claim 1" should read --claim 6--;
Column 8, line 13, "claim 1" should read --claim 6--.

Signed and sealed this 20th day of April 1971.

(SEAL)
Attest:

EDWARD M. FLETCHER, JR.
Attesting Officer

WILLIAM E. SCHUYLER, JR.
Commissioner of Patents